United States Patent [19]

Corner et al.

[11] 4,325,422

[45] Apr. 20, 1982

[54] PNEUMATIC TIRE AND WHEEL RIM ASSEMBLIES

[75] Inventors: Michael R. Corner, Coventry; Ian Kemp, Tamworth; Barrie J. Allbert; Tom French, both of Sutton Coldfield, all of England

[73] Assignee: Dunlop Limited, London, England

[21] Appl. No.: 103,390

[22] Filed: Dec. 13, 1979

[30] Foreign Application Priority Data

Dec. 29, 1978 [GB] United Kingdom ............... 50351/78

[51] Int. Cl.$^3$ ........................ B60C 15/02; B60C 3/00; B60B 21/00
[52] U.S. Cl. ............................ 152/352 R; 152/353 R; 152/362 R; 152/379.3; 152/386; 152/396; 152/DIG. 9; 152/DIG. 17; 301/97; 301/98
[58] Field of Search ......... 152/330 R, 362 R, 362 CS, 152/379.3, 379.4, 379.5, 381.3, 381.4, 381.5, 381.6, 384, 386, 396, 412–413, DIG. 9, DIG. 10, DIG. 17, 352–353; 301/95–98

[56] References Cited

U.S. PATENT DOCUMENTS

| | | | |
|---|---|---|---|
| 2,709,472 | 5/1955 | Hofweber | 152/362 R |
| 3,019,056 | 1/1962 | Keilman | 152/402 |
| 3,610,308 | 10/1971 | McDonald | 152/330 RF |
| 3,915,215 | 10/1975 | Nebout | 152/381.4 |
| 3,977,727 | 8/1976 | Glasenapp et al. | 301/97 |
| 4,015,652 | 4/1977 | Harris | 152/379.3 |
| 4,190,092 | 2/1980 | Evans et al. | 152/381.4 |
| 4,203,480 | 5/1980 | Peter et al. | 152/354 R |

FOREIGN PATENT DOCUMENTS

| | | | |
|---|---|---|---|
| 556393 | 4/1957 | Belgium | 152/339 |
| 634356 | 8/1936 | Fed. Rep. of Germany | 152/381.3 |
| 248086 | 3/1926 | United Kingdom . | |
| 283660 | 1/1928 | United Kingdom . | |
| 380163 | 9/1932 | United Kingdom . | |
| 1429676 | 3/1976 | United Kingdom . | |
| 1429885 | 3/1976 | United Kingdom . | |
| 1426215 | 11/1976 | United Kingdom . | |
| 1514183 | 6/1978 | United Kingdom . | |

*Primary Examiner*—Edward C. Kimlin
*Assistant Examiner*—Lois E. Boland
*Attorney, Agent, or Firm*—Stevens, Davis, Miller & Mosher

[57] ABSTRACT

A pneumatic tire and wheel rim assembly is disclosed in which the rim bead seats are defined by grooves having radially directed side portions which retain the associated tire bead against movement in an axial direction and each rim bead seat includes means in engagement with the tire bead to restrict rotation of the tire bead relative to the bead seat. Preferably said means comprises a plurality of projections formed integrally with part or all of the grooves which engage the associated tire bead to restrict rotation. Each projection may comprise a circumferentially extending rib or a tooth.

13 Claims, 1 Drawing Figure

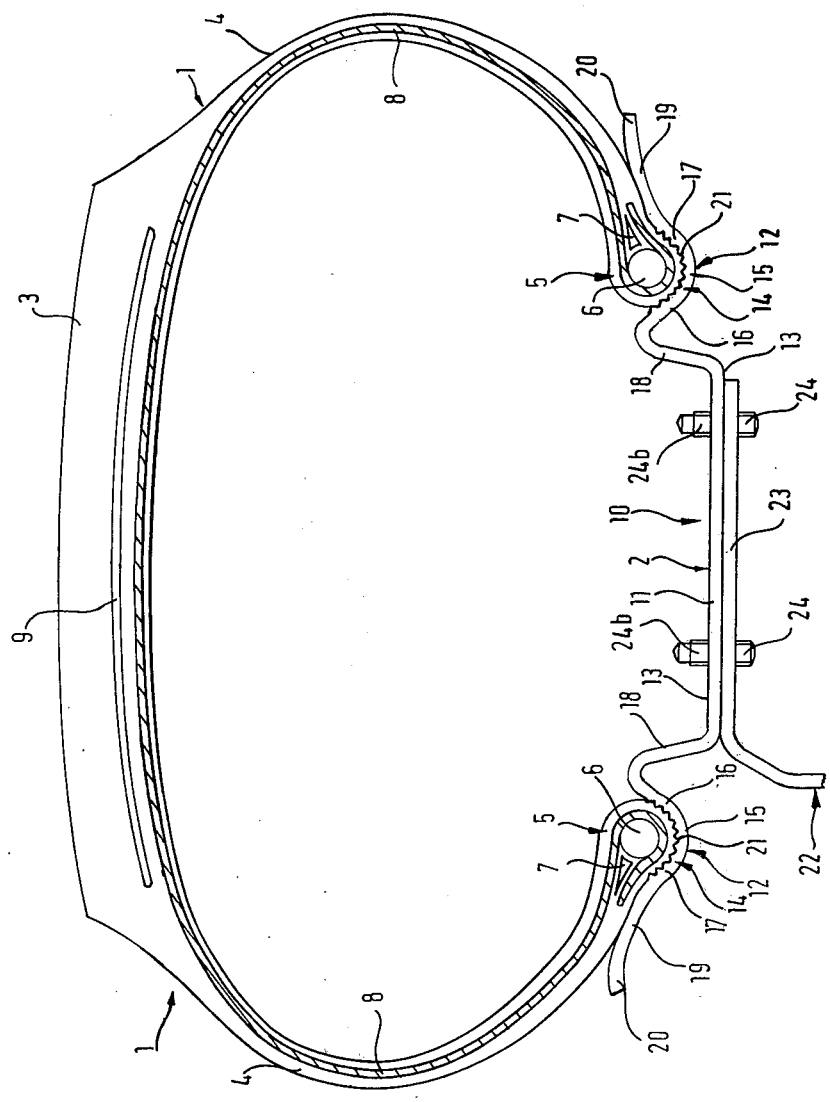

PNEUMATIC TIRE AND WHEEL RIM ASSEMBLIES

This invention concerns improvements in or relating to a pneumatic tire and wheel rim assembly and in particular to an assembly in which each of a pair of axially spaced tire beads is located and retained in an associated bead seat constructed and arranged to prevent movement of the associated tire bead in an axial direction.

Pneumatic tires are retained on their wheel rims by the engagement of beads, one at the radially inward edge of each sidewall, on bead seats. The bead seats are tapered so that inflation pressure forces the bead onto the taper to effect the engagement. The bead regions of tires are accordingly designed to provide for the taper engagement as well as anchorage of the carcass reinforcement. This requires a comparatively rigid zone in the tire bead which extends into the lower sidewall and in heavy duty tires such as are used for trucks this rigid zone may extend for up to 50% of the section height of the tire. Flexing of the sidewall is therefore transmitted to a rigid bead zone which is stiff and inefficient in absorbing deflection. As a result premature failure of the tire is often caused by failure in the bead zone. In addition the provision of a relatively long bead zone reduces the length of the sidewall and consequently the sidewall is not able to be very efficient in absorbing deflection. Furthermore the complexities of providing the necessary bead zone stiffness incurs cost.

One object of the present invention is to provide an improved means of retaining a tire on a wheel rim which obviates some of the above problems.

According to the present invention we provide a pneumatic tire and wheel rim assembly comprising a tire having a tread portion, a pair of sidewalls and a pair of axially spaced tire beads and a wheel rim having a pair of axially spaced bead seats in each of which a respective one of the tire beads is located, each bead seat comprising a groove having a base portion and a pair of opposed side portions extending in a generally radial direction from the base portion whereby each tire bead is retained against movement in an axial direction and each bead seat having means in engagement with the associated tire bead to restrict rotation of the tire bead relative to the bead seat.

Preferably each groove is annular and of arcuate cross-section. Preferably each tire bead is of complementary cross-section to the associated groove. Preferably the tire beads have a bead core. Preferably the bead core is of annular cross-section and is seated in the associated groove. Preferably the core is substantially inextensible. The core may be of the steel cable type, other types of steel reinforcement or other substantially inextensible material.

Each groove and associated tire bead may be of the type disclosed in our co-pending U.K. published Patent Application No. 2,030,085 dated Apr. 2, 1980 in which the side portions of the groove extend in a direction generally radially outwards from the base portion.

Alternatively each groove and associated tire bead may be of the type disclosed in our co-pending published U.K. Patent Application No. 2,030,087 dated Apr. 2, 1980 in which the side portions of the groove extend in a direction generally radially inwards from the base portion.

The means for restricting rotation of each tire bead relative to the associated bead seat may comprise a plurality of projections which are formed integrally with the bead seat and engage the associated tire bead. The projections are preferably of uniform size. Each projection may comprise a single annular rib which extends circumferentially around the entire bead seat. Alternatively each projection comprises a tooth. The teeth may be uniformly distributed in circumferentially extending rows with adjacent rows of teeth being aligned or offset in a circumferential direction relative to one another. Alternatively the teeth may be randomly distributed. The projections may be formed on part or all of the groove, for example the base portion and/or one or both of the side portions.

Preferably the tire is a low aspect ratio tire having an aspect ratio of 70% or less, preferably 60% or less and is preferably a radial tire. Preferably the tire has one or more steel cord plies and the crown of the tire is reinforced by one or more steel tread reinforcements. Preferably the tire tread is wider than the axial distance between the axially outer side portions of the grooves.

The wheel rim comprises a rim member profiled to define the bead seats. The rim member is retained in position by the usual wheel disc.

The rim member may be formed by one or more components. Preferably the rim member is multi-component to facilitate assembly and in one preferred construction comprises three components with appropriate sealing means therebetween. Alternatively the sealing means may be omitted and an inner tube provided.

According to a further aspect of the present invention we provide a pneumatic tire for the assembly according to the present invention.

According to yet a further aspect of the present invention we provide a wheel rim for the assembly according to the present invention.

The invention will now be described in more detail by way of example only, with reference to the accompanying diagrammatic drawing in which the single FIGURE is a cross-sectional view of a pneumatic tire and wheel rim assembly according to the present invention.

The pneumatic tire and wheel rim assembly shown in the accompanying drawing is substantially similar to that described in our previously mentioned published co-pending U.K. Patent Application No. 2,030,085 and comprises a steel ply radial tire 1 having an aspect ratio of 50% and a multi-component wheel rim 2.

The radial tire 1 has a tread 3, a pair of sidewalls 4 and a pair of annular axially spaced beads 5. Each bead 5 is similar and comprises a bead core having a steel wire cable 6 of annular cross-section and a triangular bead apex 7. The bead core is substantially inextensible and as shown does not extend into the lower portion of the adjacent tire sidewall 4 to any appreciable extent so that deflections can be absorbed by flexing of substantially the whole length of the sidewall. A single steel cord ply 8 extends circumferentially around the tire from one bead to the other bead. The ends of the ply 8 are wrapped around the associated bead core. Tread reinforcements indicated generally by the reference numeral 9 are provided radially outwards of the ply 8 and reinforce the crown of the tire.

The wheel rim 2 comprises a rim member 10 having a cylindrical centre portion 11 and axially spaced end portions defining bead seats 12. The rim member 10 is formed by three similar elements 13 (one only shown) which may be formed by rolling, casting or other suitable methods. Sealing means (not shown) is provided between the abutting ends of the elements 12.

Each bead seat 12 is similar and comprises an annular groove 14 having a base portion 15 and opposed side portions 16 and 17 respectively which extend radially outwards from the base portion 15. The side portion 16 leads to a radially inwardly directed extension 18 which leads to the centre portion 11. The side portion 17 leads to an axially outwardly directed support ledge 19 which is tapered radially outwards in a direction leading from the side portion 17 at a relatively small angle with respect to the rotational axis of the rim and terminates in a radius 20. The lower portion of the tire sidewall 4 seats on the ledge 19 when the tire is inflated.

Each groove 12 has a plurality of projections 21, for example ribs which extend circumferentially around the entire groove and cover substantially all of the base and side portions 15, 16, 17 which contact the associated bead 5. The projections 21 are formed integrally with the grooves 14.

A wheel disc 22 comprising a cylindrical element 23 fits within the centre portion 11 of the assembled outer rim member 10 and is secured to each element 13 by bolts 24 which are rendered air-tight by means of O-rings (not shown). Alternatively a tube may be fitted.

Assembly of the tire and rim is as follows, the beads 5 are located in the associated portion of the bead seats of each element 13. With all three elements 13 in position the wheel disc 22 is fitted and secured to the elements 13 by engaging the bolts 24 in threaded nuts 24b welded to the elements 13. A valve (not shown) provided in the extension 18 of one of the elements 13 allows the tire to be inflated.

As shown, the tread 3 is wider than the axial distance between the axially outer side portions of the grooves 14 and the diameter defined by the radial inner surface of each bead cable 6 is less than the maximum diameter of the side portions 16, 17 of the associated groove 14. The bead cables 6 are substantially inextensible and consequently when the tire is inflated the beads 5 are retained in the associated groove 14 with the projections 21 embedded in the adjacent surface of the beads 5. When the tire is deflected the side portions 16, 17 of each groove 14 prevent movement of the associated beads 5 in an axially inwards or outwards direction while the engagement of the projections 21 with the beads 5 restrains any tendency for the beads to rotate in the bead seats.

Although the above-described wheel rim is a multi-component wheel rim it is possible to form the wheel rim of the invention as a single component, for example by casting. If the wheel rim is formed as a single component it is envisaged that the portions of each groove and the associated ledge may be formed to extend in an axially outwards direction to assist in location of the substantially inextensible reinforced beads and then pressed or crimped by a suitable tool to the appropriate shape.

Furthermore the wheel rim may have a well as in the above-described embodiment or the well may be omitted, it being understood that a well is not required for fitting the tires according to the present invention. The support ledges 19 may be omitted.

The number, arrangement and dimensions of the projections 21 may be varied to give any desired resistance to rotational movement of the beads for a given inflation pressure. Thus the projections may be on the base portion and/or one or both side portions of each groove. Furthermore each projection may comprise a tooth or prong. The teeth may be uniformly distributed in circumferentially extending rows with the teeth of adjacent rows being aligned or offset in a circumferential direction relative to one another. Alternatively the teeth may be randomly distributed.

In an alternative construction (not shown) each groove and the associated tire bead are of complementary non-circular cross-section, for example rectangular. In this case the shape selected for each groove and its associated tire bead restricts any tendency for the tire bead to rotate relative to the bead seat. In addition each bead seat may include projections as described above.

Having now described our invention what we claim is:

1. A pneumatic tire and wheel rim assembly comprising:
   a tire having a reinforced tread portion, a pair of sidewalls and a pair of axially spaced tire beads each with a substantially inextensible bead reinforcement;
   a wheel rim having a pair of axially spaced bead seats defined by grooves in each of which a respective one of said tire beads is located, each groove comprising a base portion and a pair of opposed side portions which extend in a generally radially outwards direction from said base portion;
   said reinforced tire tread portion having an axial width greater than the axial distance between the axially outer side portions of said grooves;
   each of said side portions projecting radially outwards beyond the radially inner surface of the adjacent inextensible bead reinforcement whereby each tire bead is retained against movement in an axial direction, each rim bead seat having means in engagement with the associated tire bead to restrict rotation of said tire bead relative to said rim bead seat.

2. An assembly according to claim 1 wherein said means for restricting rotation of each tire bead comprises a plurality of projections.

3. An assembly according to claim 2 wherein said projections are formed integrally with the associated rim bead seat.

4. An assembly according to claim 2 wherein each projection comprises a rib which extends circumferentially around the associated rim bead seat.

5. An assembly according to claim 4 wherein each rib is continuous around the entire rim bead seat.

6. An assembly according to claim 2 wherein said projections are of uniform size.

7. An assembly according to claim 2 wherein said projections are provided on the base and side portions of the associated groove.

8. An assembly according to claim 1 wherein said axially outer side portion of each groove leads to an axially and radially outwardly directed support ledge.

9. An assembly according to claim 1 wherein said tire is a radial tire.

10. An assembly according to claim 9 wherein said tire has an aspect ratio of 70% or less.

11. An assembly according to claim 1 wherein the lower portion of said tire sidewalls leading to the associated tire bead extend substantially parallel to the rotational axis of said tire.

12. An assembly according to claim 1 wherein said rim is multi-component.

13. An assembly according to claim 12 further comprising a wheel disc having a cylindrical portion located within and secured to said rim components to retain said rim components in position and to mount the assembly on a vehicle.

* * * * *